US010546225B2

(12) United States Patent
Kim et al.

(10) Patent No.: US 10,546,225 B2
(45) Date of Patent: Jan. 28, 2020

(54) METAL CONTACTLESS SMART CARD AND METHOD FOR FABRICATING THE SAME

(71) Applicants: Soo Hyang Kang, Brea, CA (US); Nam Joo Kim, Seoul (KR)

(72) Inventors: Nam Joo Kim, Seoul (KR); Heui Chul Hwang, Daegu (KR)

(73) Assignees: Soo Hyang Kang, Brea, CA (US); Nam Joo Kim, Seoul (KR)

( * ) Notice: Subject to any disclaimer, the term of this patent is extended or adjusted under 35 U.S.C. 154(b) by 0 days.

(21) Appl. No.: 15/955,495

(22) Filed: Apr. 17, 2018

(65) Prior Publication Data
US 2018/0232617 A1    Aug. 16, 2018

Related U.S. Application Data

(62) Division of application No. 15/489,318, filed on Apr. 17, 2017.

(30) Foreign Application Priority Data

Apr. 21, 2016    (KR) ........................ 10-2016-0048787

(51) Int. Cl.
G06K 19/00    (2006.01)
G06K 19/077    (2006.01)

(52) U.S. Cl.
CPC .    *G06K 19/07722* (2013.01); *G06K 19/07773* (2013.01)

(58) Field of Classification Search
CPC ........................ G06K 19/07722; B32B 37/185
USPC ................................................ 235/488, 492
See application file for complete search history.

(56) References Cited

U.S. PATENT DOCUMENTS 6,036,099 A  *  3/2000  Leighton ............... B32B 37/185
                                                          156/154
2017/0017871 A1*  1/2017  Finn ................. G06K 19/07722

* cited by examiner

*Primary Examiner* — Daniel A Hess
(74) *Attorney, Agent, or Firm* — Heedong Chae; Lucem, PC

(57) ABSTRACT

A metal contactless smart card includes a first metal layer having a first slit, a second layer, a radio-frequency integrated circuit chip module, and an inlay having an antenna. A nonconductive insert may be fitted in the slit. The first metal layer may include an inlay recess where the inlay may be received and a through-hole where the chip may be inserted. The second layer of the smart card may be made of metal and may also include a slit.

17 Claims, 16 Drawing Sheets

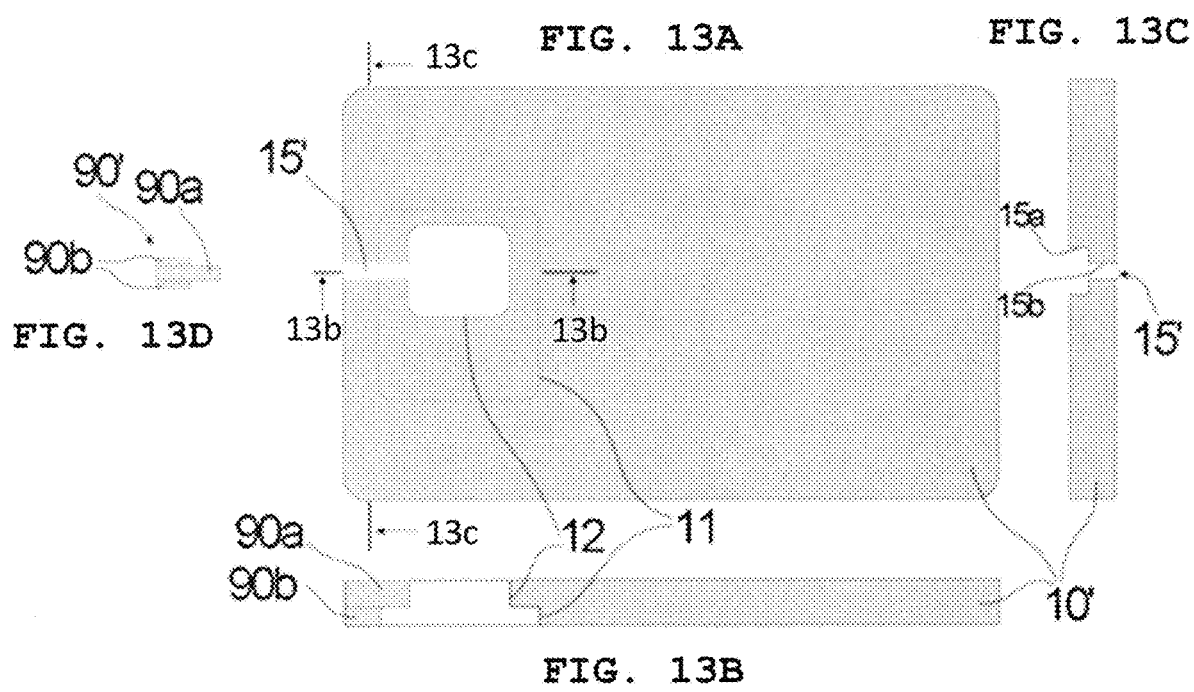

METAL CONTACTLESS SMART CARD AND METHOD FOR FABRICATING THE SAME

CROSS-REFERENCE TO RELATED APPLICATIONS

This application is a Divisional application of and claims priority to U.S. Utility patent application Ser. No. 15/489,318 filed Apr. 17, 2017, which claims priority to Korean patent application No. 10-2016-0048787 filed on Apr. 21, 2016 with the Korean Intellectual Property Office, the disclosures of which are incorporated herein by reference.

FIELD OF THE INVENTION

The present invention relates to a metal contactless smart card, more particularly, to a metal smart card capable of communication by radio frequency or near-field communication, and a method of fabricating the same.

BACKGROUND OF THE INVENTION

Smart cards using an integrated circuit (IC) chip or a combination of an IC chip and a magnetic strip are classified into contact types and contactless types. Contactless smart cards can employ radio-frequency (RF) communication or near-field communication (NFC) to communicate with a compatible reader and have been used as credit cards, transportation passes, identification cards, membership cards, and the like.

While such cards are generally made substantially of plastic materials such as polyvinyl chloride (PVC), card-issuing companies have found a need to produce metal smart cards, which can feel and look more sophisticated and higher in quality. Accordingly, metal smart cards have grown in popularity in recent years; for example, credit card companies may issue metal credit cards to customers with high credit ratings or high net worth.

However, such metal smart cards have been by and large limited to contact-type smart cards. When metal layers are incorporated into contactless type smart cards, the attenuation of any kind of RF or NFC signal due to the presence of the metal layers often makes contactless metal cards unusable.

To overcome this problem, plastic contactless cards having thin metal film layers have been used. However, such films are susceptible to deterioration or discoloration. Additionally, a plastic card having a metal thin film lacks the desirable heft of a card having substantial metal layers.

The introduction of a slit through a part of a metal sheet has been proposed to allow metallic layers to have contactless communication capabilities (for example through a metallic case of a smart phone). However, when incorporated into flat cards, the incorporation of a slit is detrimental to its structural properties. Namely, a card having a slit can be highly susceptible to cracking and breaking. Such fragility is not desirable in smart cards that are frequently handled and may be subject to flexing, dropping, or other abuse. For example, a credit card having a slit may be put into a wallet and subsequently be sat on resulting in the card breaking due to torsional and normal stresses.

Therefore, there is a need for a metal contactless smart card that is durable. This invention is directed to address the above problems and satisfy a long-felt need.

SUMMARY OF THE INVENTION

The present invention contrives to solve the disadvantages and shortcomings of the prior art. The present invention provides a metal contactless smart card and a method for fabricating the same.

Hereinafter, in this specification and claims, NFC and RF are not largely distinguished, but are collectively called "RF" or "contactless", and a chip for all contactless cards including an NFC chip for the near field or an RF chip for the far field is called a "RFIC" chip.

One object of the present invention is to provide a contactless smart card 100, 100', or 100" including: a radio-frequency integrated circuit (RFIC) chip module 20; an inlay 40 having an antenna to enable contactless communication of the RFIC chip module 20 with an external reader; a first metal layer 10 or 10' having a through-hole 12 in which the RFIC chip module 20 may be inserted and a recess 11 on which the inlay 40 may be received; a second layer 60 or 80 attached to a lower side of the first metal layer; and a first slit 15 or 15' formed in the first metal layer 10 or 10' and disposed from the through-hole 12 to an outer edge of the first metal layer 10 or 10', wherein a current in the first metal layer 10 or 10' induced by & magnetic field is concentrated along the first slit 15 or 15', wherein the first slit 15 or 15' enhances contactless communication of the RFIC chip module 20 with an external reader.

The first metal layer 10 or 10' may be directly attached to the second layer 60 or 80 or it may be indirectly attached to the second layer 60 or 80. If the first metal layer 10 or 10' is not directly attached to the second layer 60 or 80, one or more layers or partial layers may be disposed between the first metal layer 10 or 10' and the second layer 60 or 80.

The recess 11 may be formed on the lower side of the first metal layer 10.

The recess 11 may surround the through-hole 12. The recess 11 may surround the through-hole 12 on every side of the through-hole 12, or the recess 11 may surround the through-hole 12 on less than all of the sides of the through-hole 12.

The first slit 15 or 15' may be greater than 0.1 mm in width.

The cross-sectional profile of the first slit 15' may be wider on the lower side of the first metal layer 10' than an upper side of the first metal layer 10'.

The second layer 60 may be made of a synthetic resin. The synthetic resin may be polyvinyl chloride (PVC), or another nonconductive material, including but not limited to polyethylene terephthalate, acrylonitrile butadiene styrene, or polycarbonate.

The second layer 80 may be metallic. The second layer 30 may be made of a metal or a metal alloy. The second layer 80 may be stainless steel, an aluminum, an aluminum alloy such as duralumin, scandium, copper, or a copper alloy. The stainless steel may be grade 301 stainless steel. Alternatively, the stainless steel may be grade 304 stainless steel.

The metallic second layer BO may include a second slit 85, wherein the second slit 85 may be disposed from an interior portion of the second layer 80 to an edge of the second layer 80.

The second slit 85 may be disposed to be substantially aligned with the first slit 15. The slits being substantially aligned may mean that the first slit 15 is substantially overlaid (superimposed) on the second slit 85 when the first layer 10 and the second layer 80 are attached.

The second slit 85 may be disposed to be substantially aligned in a lengthwise direction with the first slit 15 and shifted in a widthwise direction with respect to the first slit 15. The shift in the widthwise direction with respect to the first slit 15 may be by less than the width of the first slit 15.

The smart card may further include an insert 90 disposed in the first slit 15 and the second slit 85, wherein the insert shape corresponding to the stacked slits 15 and 85.

The smart card may further include a connection layer 70 disposed between the first layer 10 and the second layer 80, wherein the connection layer 70 is made of a nonconductive material.

The inlay 40 may include a substrate, the antenna having a wound coil 42 on a surface of the substrate, and two inlay terminals 41 and 41' formed at the ends of the wound coil 42, wherein the inlay terminals 41 and 41' may be electrically connected to two RFIC chip module terminals 14 and 14'.

In another embodiment, the inlay 40 may include a substrate, the antenna having a first wound coil 42 and a second wound coil 42', and two inlay terminals 41 and 41'. The inlay terminals 41 and 41' may be formed to pass through the substrate of the inlay 40 as to be exposed on both sides of the inlay 40. The inlay terminals 41 and 41' may be formed at the ends of the first wound coil 42 and the second wound coil 42', wherein the first wound foil 42 may be formed on a surface of the substrate of the inlay 40 and the second coil 42' may be formed on an opposite surface of the substrate of the inlay 40. The two coils 42 and 42' may be connected by a via hold 43 formed through the substrate of the inlay 40. The inlay terminals 41 and 41' may be electrically connected to two RFIC chip module terminals 14 and 14'.

One of the two coils 42 and 42' may further include a wide portion 42a and the other of the two coils 42 and 42' may further include a plurality of islands 44 and 44'. The overall capacitance of the inlay may be adjusted by electrically insulating a number of islands 44' or connecting a number of islands 44, thereby facilitating impedance matching.

The contactless smart card may further include a PVC thin film 50 received in the recess 11 disposed between the second layer 60 and the inlay 40.

The contactless smart card may further include an insert 90 positioned in the slit 15, wherein the insert 90 may be made of a nonconductive material and may be substantially of the same shape as the slit 15.

In one embodiment, the insert 90' may include a rod-shaped body with a left wing and a right wing 90b. The left wing and right wing 90b may be formed on opposite sides of the rod-shaped body 90a. The left wing and right wing 90b may each be smaller in length than the rod-shaped body 90a.

The smart card may further include a thin film 90c formed on an end of the insert 90, wherein the thin film 90c may be made of a nonconductive material and may be received in the inlay groove 11 and disposed between the second layer 60 and the inlay 40.

Another object of the present invention is to provide a method of fabricating a smart card having a first metal layer 10 or 10' with a first slit 15, a RFIC chip module 20, an inlay 40 having an antenna, and a second layer 60 or 80. Such a method may include the steps of: forming a RFIC chip module through-hole 12 and an inlay recess 11 on the first metal layer 10; plugging the slit 15 formed in the first layer 10 with a nonconductive material; layering a dummy chip module 20' on a second layer 60; bonding the first layer 10 and the second layer 60; and removing the dummy chip module 20' and installing the RFIC chip module 20.

The first layer 10 and the second layer 60 may be bonded by heat-pressing in the above embodiment.

Another method of fabricating a contactless smart card may comprise the steps of: forming a RFIC chip through-hole 12 and an inlay recess 11 on a first metal layer 10; laminating an inlay 40 on the inlay recess 11 an insert 90 in a slit 15 of the first metal layer 10, and a dummy chip module 20' in the through-hole 12, wherein the inlay 40 may include an antenna and the insert 90 is made of a nonconductive material; bonding the first metal layer 10 on a second layer 60; and removing the dummy chip module 20' and installing a RFIC chip module 20.

The first layer 10 and the second layer 60 may be bonded by heat-pressing in the above embodiment.

Although the present invention is briefly summarized, the fuller understanding of the invention can be obtained by the following drawings, detailed description, and appended claims.

BRIEF DESCRIPTION OF THE DRAWINGS

These and other features, aspects, and advantages of the present invention will become better understood with reference to the accompanying drawings, wherein:

FIG. 13A is a top plan view of a metal layer by itself according to a third embodiment of the present invention.

FIG. 13B is a cross-sectional view along the line 13b-13b in FIG. 13A.

FIG. 13C is a cross-sectional view thereof along the line 13c-13c in FIG. 13A.

FIG. 13D is a top plan view of the insert by itself according to the third embodiment of the present invention.

DETAILED DESCRIPTION OF THE EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations by use of the word "about", it will be understood that the particular value forms another embodiment.

Figure 1:
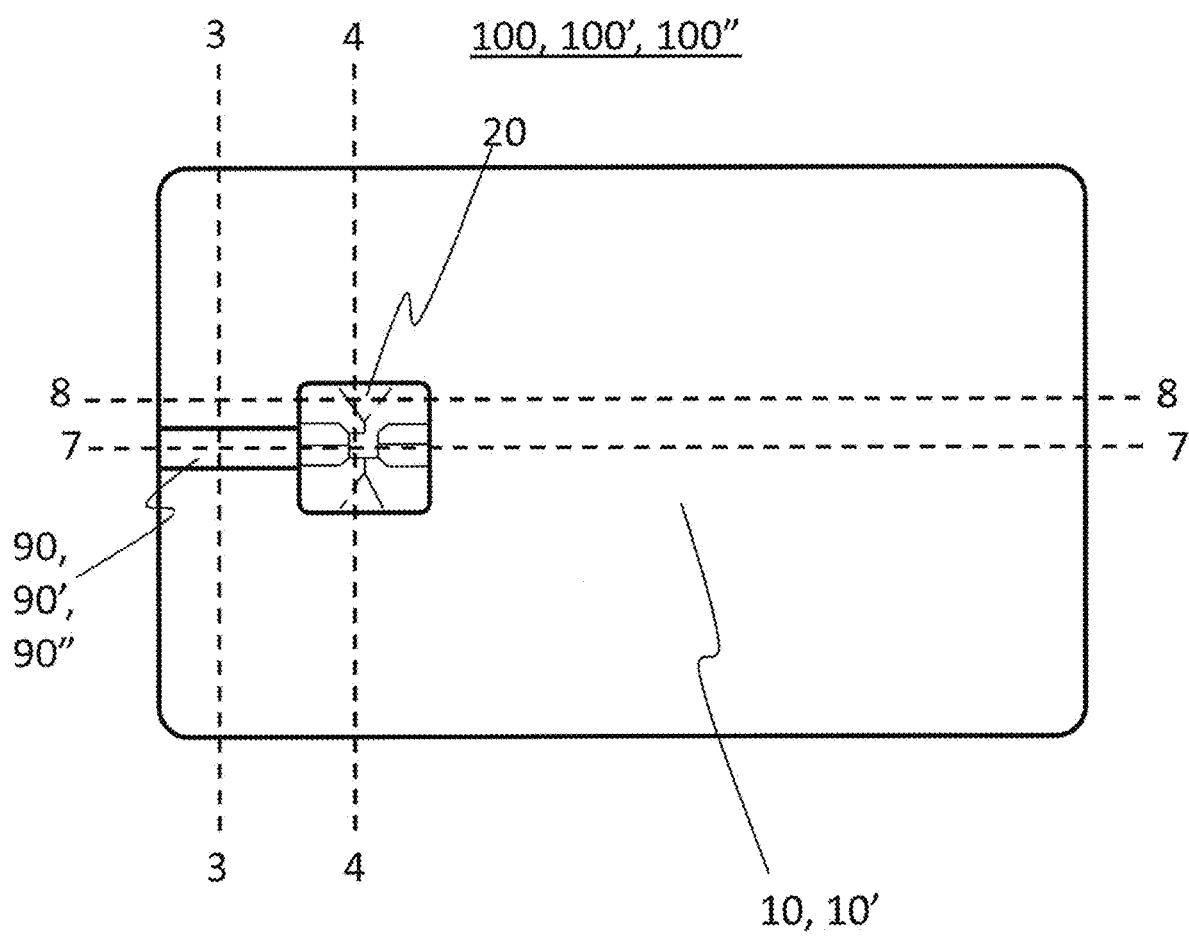
FIG. 1 is a top plan view of a smart card.

FIG. 1 is a top view of a contactless smart card 100, 100', or 100" of the present invention. The smart card 100', or 100" may include a RFIC chip module 20, a first metal layer 10 or 10', and an insert 90. The first metal layer 10 may be made of a metal or a metal alloy.

Figure 2:
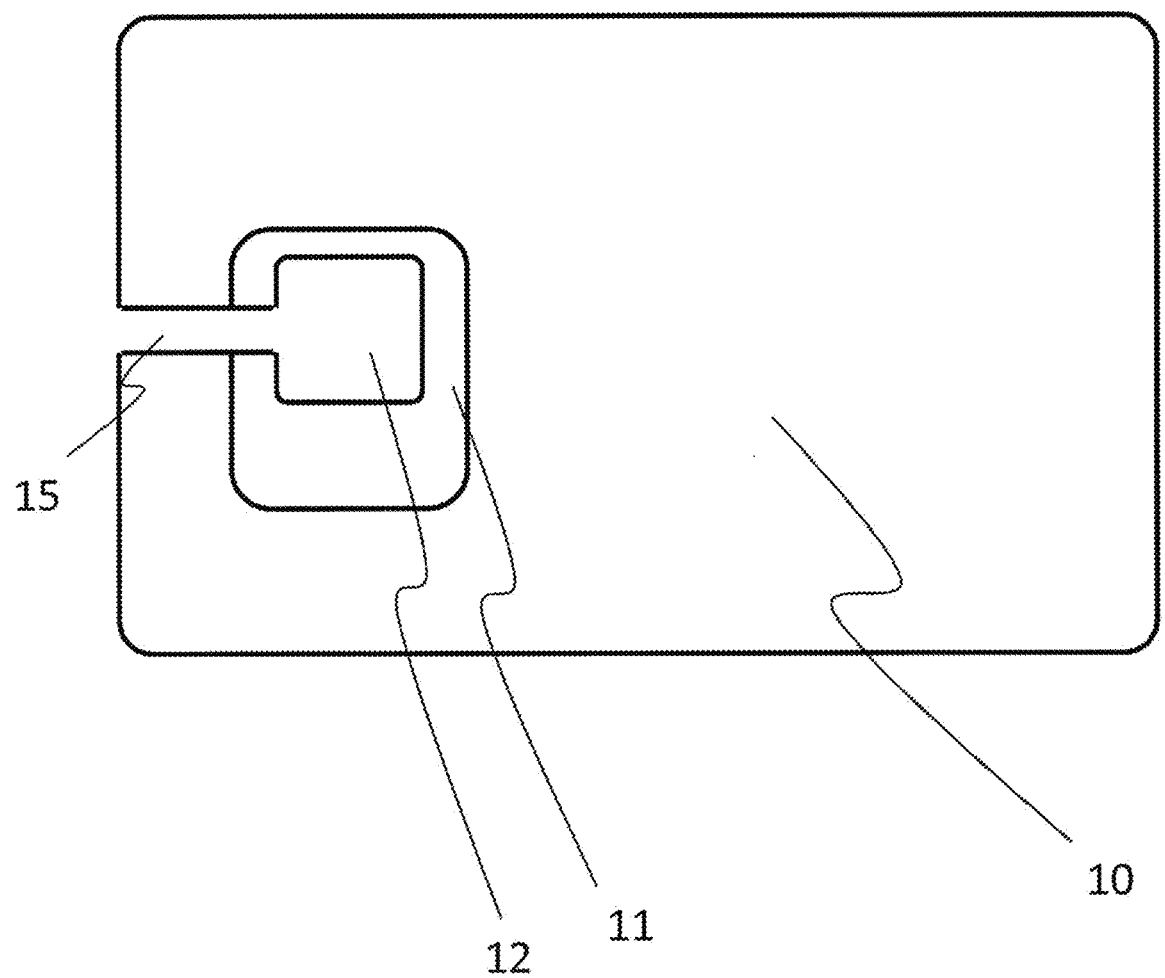
FIG. 2 is a bottom plan view of a first metal layer of the smart card.

FIG. 2 is a bottom view of the first metal layer 10 by itself. The first metal layer 10 may have a recess 11, a through-hole 12, and a first slit 15.

An inlay 40 may be received in the recess 11. The inlay 40 may be electrically connected to the RFIC chip module 20 and the RFIC chip module 20 may be disposed on top of the inlay 40. The RFIC chip module 20 may be inserted in the through-hole 12. The dimensions of the recess 11 may be larger than the dimensions of the through-hole 12. The recess 11 may completely or partially surround the through-hole 12.

The slit 15 of the first metal layer 10 may be at least 0.1 mm in width. The slit 15 may be formed so that it connects the through-hole 12 to an edge of the first metal layer 10. In the presence of an applied magnetic field, an current may be induced in the first metal layer 10 or 10'. The current may be concentrated along the first slit 15 and enhance the contactless communication of the smart card 100, 100', or 100" with an external reader.

Figure 3:
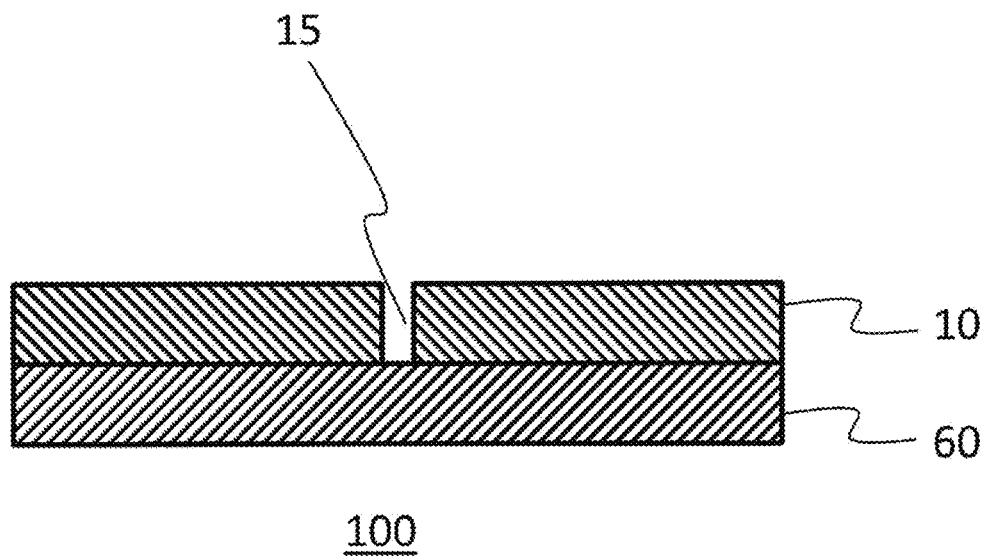
FIG. 3 is a cross-sectional view along the line 3-3 in FIG. 1.

FIG. 3 shows a cross-sectional view along the line 3-3 of FIG. 1 with the insert 90, 90', or 90" removed. A second layer 60 may be attached to a lower side of the first metal layer 10. The slit 15 in the first metal layer 10 may need to be at least 0.1 mm in width to allow the card 100 to function as a contactless card. Preferably, the slit may be 0.1 mm to 3 mm in width. More preferably, the slit may be 1 mm to 2 mm in width. The second layer 60 may be made of a synthetic resin. The synthetic resin of the second layer 60 may be made of polyvinyl chloride (PVC).

Figure 4:
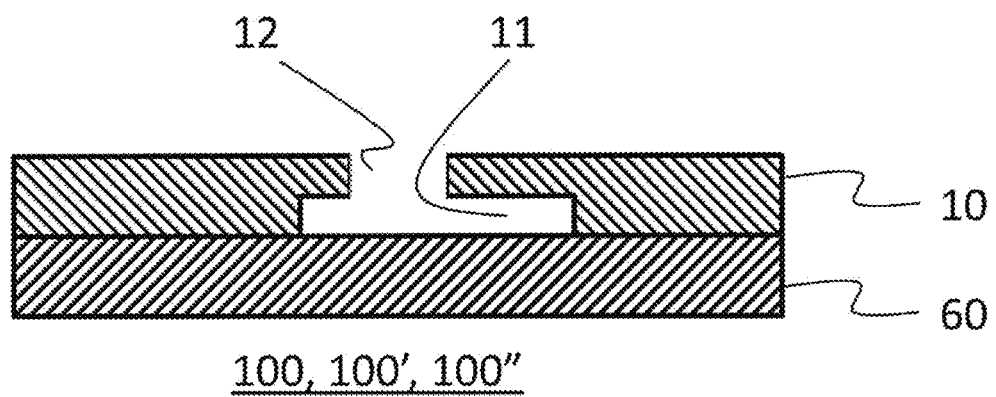
FIG. 4 is a cross-sectional view along the line 4-4 in FIG. 1.

FIG. 4 shows a cross-sectional view along the line 4-4 of FIG. 1 with the RFIC chip module 20 and the inlay 40 removed. The illustration shows a schematic arrangement of the recess 11 and the through-hole 12 of the first metal layer 10.

Figures 5A, 5B:
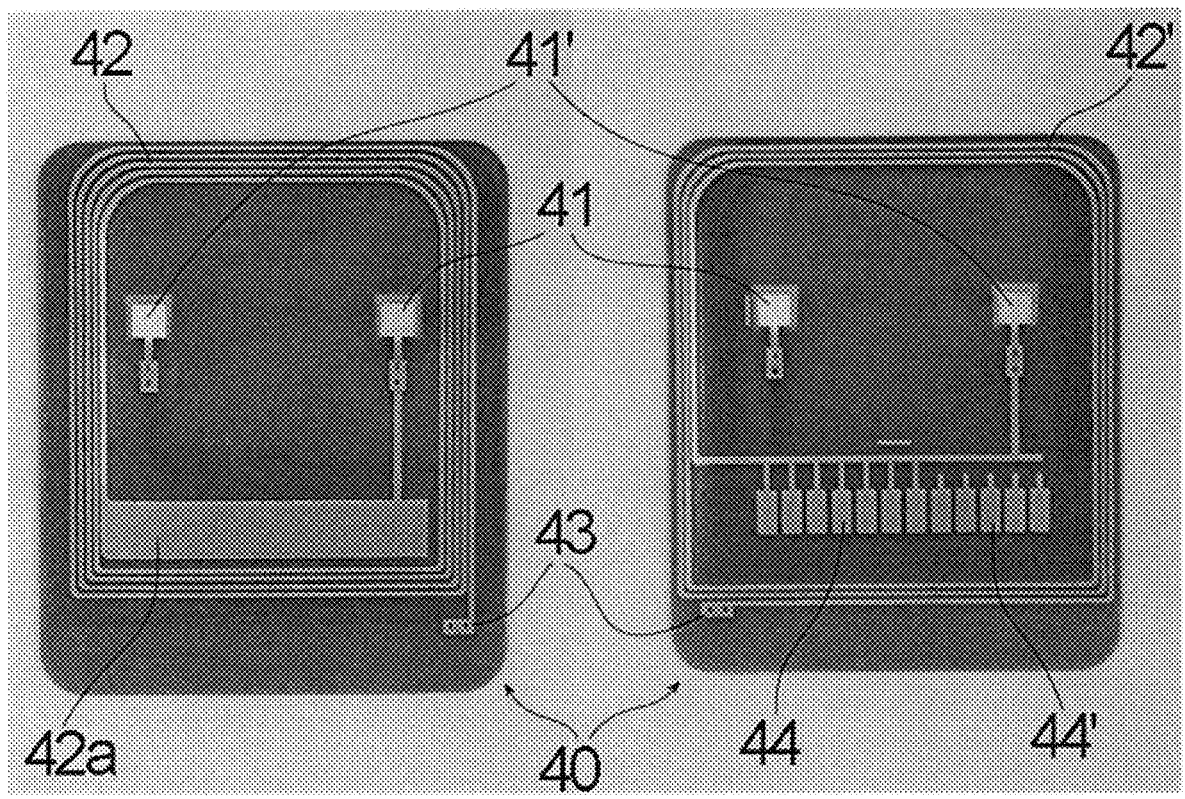
FIG. 5A is a top plan view of the inlay by itself according to one embodiment of the present invention.
FIG. 5B is a bottom plan view thereof.

The inlay 40 may include a substrate, an antenna having a wound coil 42 on a surface of the substrate, and two inlay terminals 41 and 41' formed at the ends of the wound coil 42, wherein the inlay terminals 41 and 41' may be electrically connected to two RFIC chip module terminals 14 and 14'. Features of the inlay are shown in FIGS. 5A and 5B, which show the top and bottom views, respectively, of the inlay 40 by itself. The coil 42 may be wound, printed, or formed by etching a pattern in the inlay and attaching copper foil or another conductive thin film. The substrate may be a flexible printed circuit board (FPCB) substrate.

The antenna having the wound coil 42 may be formed to substantially overlay with the recess 11 of the first metal layer 10. The wound coil 42 may be formed to be adjacent to an outer perimeter of the inlay 40.

In some embodiments of the invention, the inlay may include a substrate, the antenna having a wound coil wherein the wound coil includes a first wound coil 42 and a second wound coil 42', and two inlay terminals 41 and 41', wherein the inlay terminals 41 and 41' may be formed to pass through the substrate of the inlay 40 as to be exposed on both sides of the inlay 40. The inlay terminals 41 and 41' may formed at the ends of the first wound coil 42 and the second wound coil 42'. The first wound coil 42 may be formed on a surface of the substrate of the inlay 40 and the second coil 42' may be formed on an opposite surface of the substrate of the inlay 40, wherein the two coils 42 and 42' may be connected by a via hole 43 formed through the substrate of the inlay 40.

The first coil 42 may be wound from the inlay terminal 41 in a clockwise direction on the upper side of the inlay 40 (shown in FIG. 5A), then connected to an opposite side of the inlay 40 through a via hole 43, wound as the second coil 42' on the opposite side of the inlay 40 in a counterclockwise direction (shown in FIG. 5B), and then connected to the second inlay terminal 41'.

In one embodiment of the present invention, one coil 42 may include a wide portion 42a and the other coil 42' may include a plurality of islands 44 and 44'. The plurality of islands 44' may not be connected as part of the second coil 42'. By varying the number of islands that are connected or disconnected, the size of the effective capacitor formed by the wide portion 42a and the plurality of islands 44 may be tuned. Accordingly, by adjusting the overall capacitance, impedance matching may be facilitated.

Figures 6A, 6B:
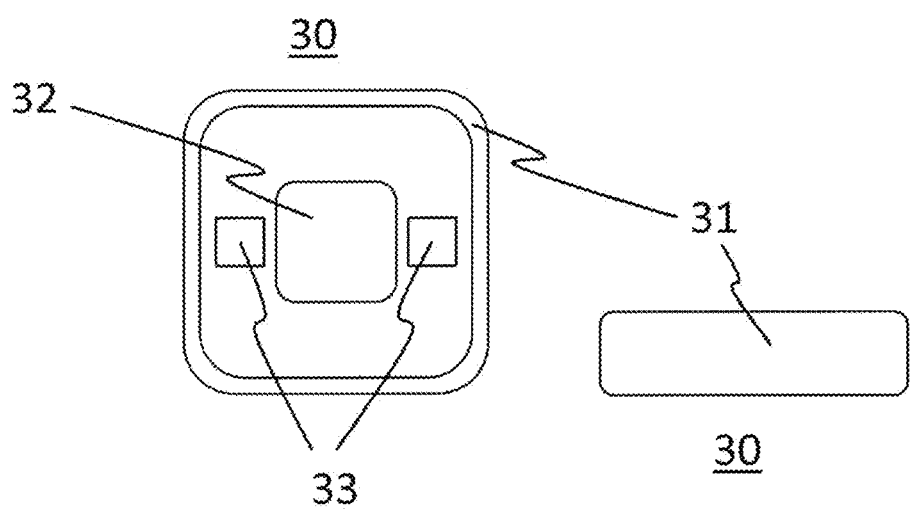
FIG. 6A is a top plan view of the PVC ring by itself.
FIG. 6B is a front view thereof.

The smart card 100, 100', or 100" may further include a PVC ring 30, which is shown by itself in the top view of FIG. 6A and the front view of FIG. 6B. The PVC ring 30 may be shaped as to fit around the RFIC chip module 20. The PVC ring 30 may include a wall 31 to surround an outer edge of the RFIC chip module 20. The RFIC chip module 20 may include a projection 22, which may be received in an aperture 32 of the PVC ring 30. The PVC ring 30 may further include terminal openings 33. The terminal openings 33 may allow the inlay terminals 41 and 41' to be electrically connected to RFIC chip module terminals 14 and 14'. The PVC ring 30 may insulate the RFIC chip module 20 from the first metal layer 10.

Figure 7:
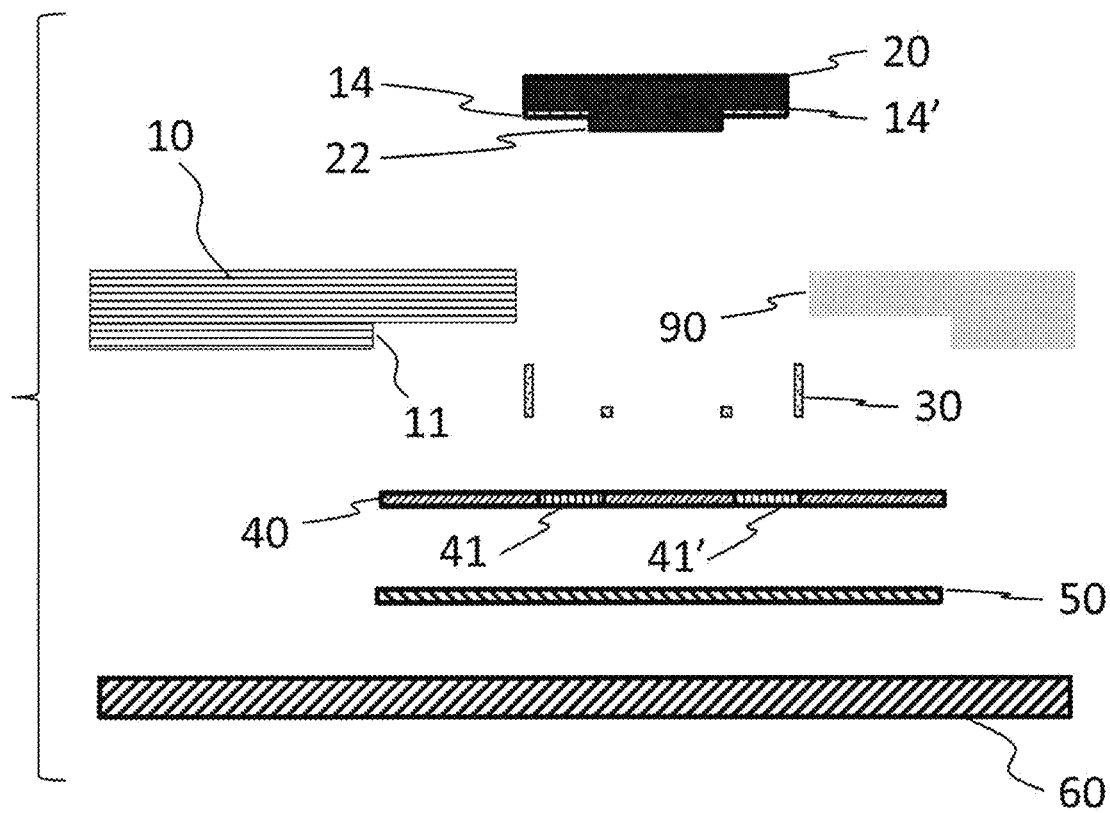
FIG. 7 is an exploded cross-sectional view of a metal smart card according to one embodiment of the present invention along line 7-7 in FIG. 1.

FIG. 7 is an exploded cross-sectional view along the line 7-7 of FIG. 1. The smart card 100, 100', or 100" may further include a nonconductive thin film 50. The thin film 50 may be made of PVC. The thin film 50 may be used to compensate for variances in thicknesses. The thin film 50 may be positioned between the second layer GO and the inlay 40. The inlay 40 and thin film 50 may be positioned in the inlay recess 11 of the first metal layer 10. When fitted into the recess 11, the inlay terminals 41 and 41' may become electrically connected to the RFIC chip module terminals 14 and 14'.

The slit 15 may be filled by an insert 90. The insert 90 may be substantially the same shape and size as the slit 15. The insert 90 may help to prevent the card from cracking or splitting. The insert 90 may be made of a nonconductive material such as PVC. The insert 90 may be customized as a decorative feature of the card 100; for example, the insert 90 may be of a desired color or may be emblazoned with a logo.

Figure 8:
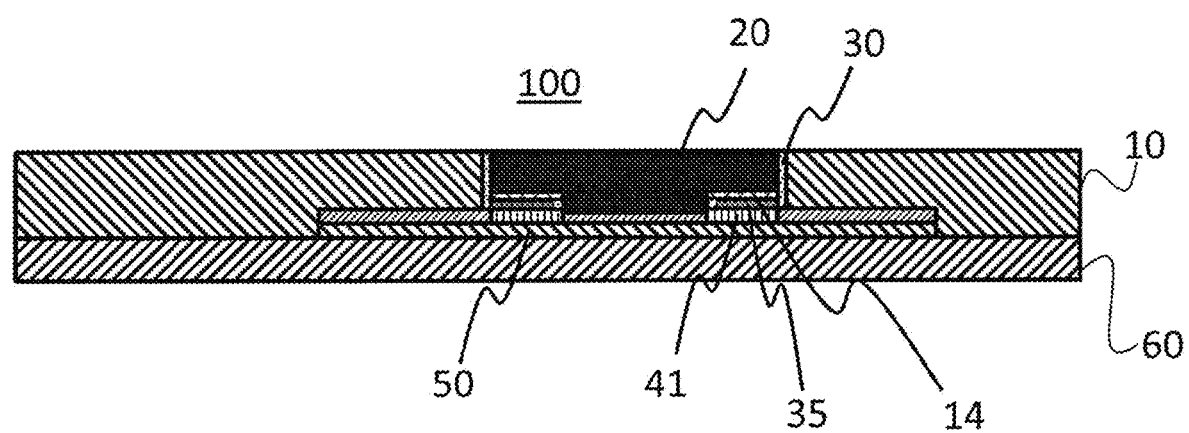
FIG. 8 is a cross-sectional view thereof along line 8-8 in FIG. 1.

In the embodiment shown in FIG. 8, the card 100 may be constructed so that a PVC thin film 50 is positioned on a second layer 60, the inlay 40 may be placed on the thin film 50, a conductive material 35 may be applied on the inlay terminals 41 and 41', the PVC ring 30 may be positioned on the inlay 40, the RFIC chip module 20 may be fitted onto the PVC ring 30, and the first metal layer 10 having the inlay recess 11 and the through-hole 12 may be placed on the second layer such that the RFIC chip module 20 fits in the through-hole 12 and the inlay 40 is positioned in the inlay recess 11.

The thickness of the layers depicted in the drawings may not be to scale and the relative thickness of each layer may vary. For example, if the thickness of the card 100 is about 0.76±0.08 mm, it may be suitable for the first metal layer 10 to be about 0.54 mm and the second layer 60 to be about 0.20 mm. For different final card thicknesses, these layer thicknesses may be scaled accordingly, but not necessarily proportionately. In the case a separate adhesive layer is used between the first metal layer 10 and the second layer 60, the second layer 60 may be thinner. In some embodiments, the depth of the inlay recess 11 may be about 0.24 mm and the thickness of the inlay 40 may be about 0.04 mm. The thickness of the thin film 50 or the PVC ring 30 may be varied to compensate for any gaps or variances in thicknesses.

The insert 90, the thin film 50 and the PVC ring 30 are not necessarily made of PVC, but may be made of another nonconductive material, including but not limited to polyethylene terephthalate, acrylonitrile butadiene styrene, and polycarbonate.

Figure 9A:
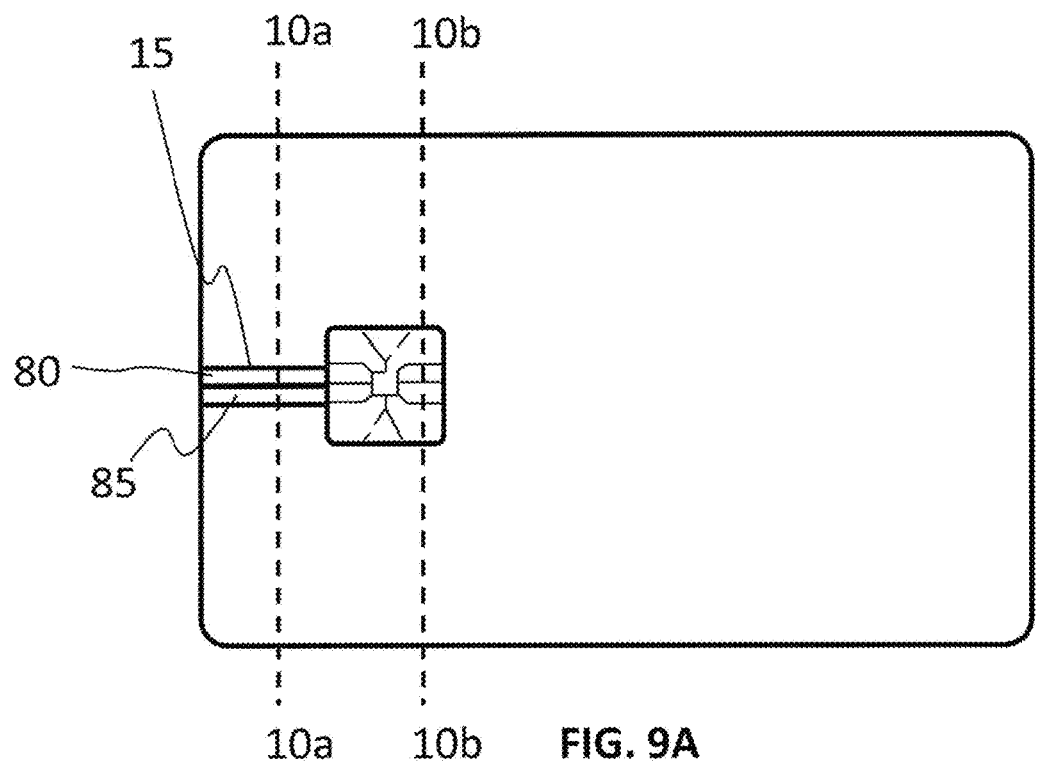
FIG. 9A is a top plan view of another embodiment of the smart card of the present invention.
Figure 9B:
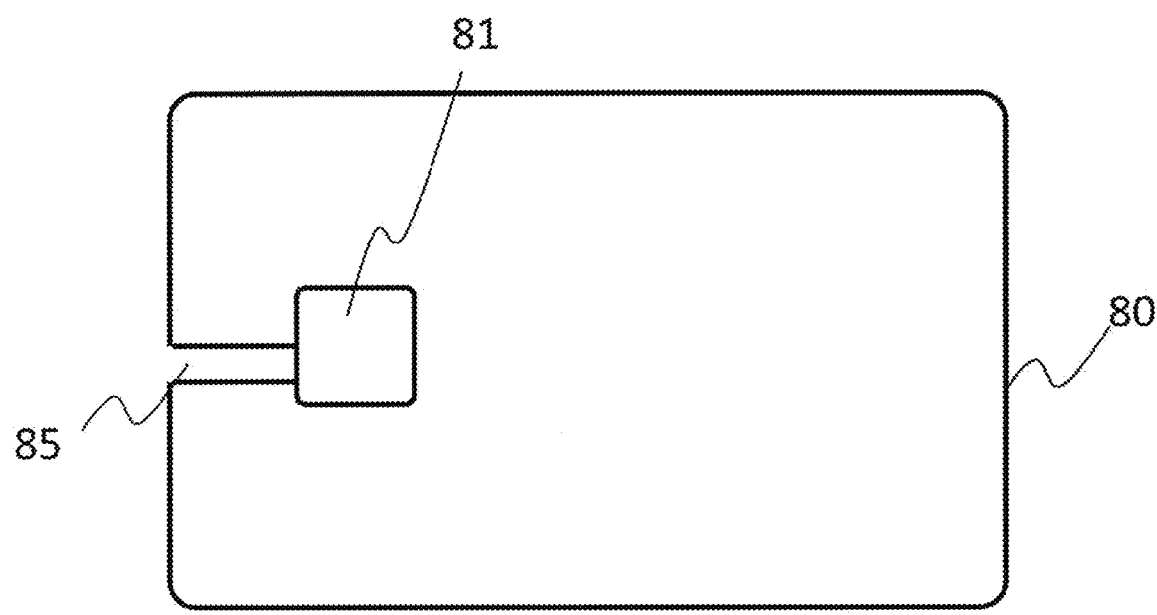
FIG. 9B is a top plan view of the second layer by itself.

In some embodiments of the metal contactless smart card 100', the second layer 80 may be made of a metal. In the case of the card 100' wherein both the first layer 10 and the second layer 80 are made of metal, first layer 10 may be substantially the same as the first layer 10 of the card 100 having a nonconductive second layer 60. FIG. 9A shows a top plan view of the smart card 100' with a second layer 80 having a second slit 85, wherein the insert 90 has been removed for clarity illustration. FIG. 9B shows the second layer 80 by itself. The second layer slit 85 may extend to an outer edge of the card as shown in the top plan view of the second layer. The second layer 80 may include a recess formed to have about the same area as the RFIC chip module 20.

Figure 10A:
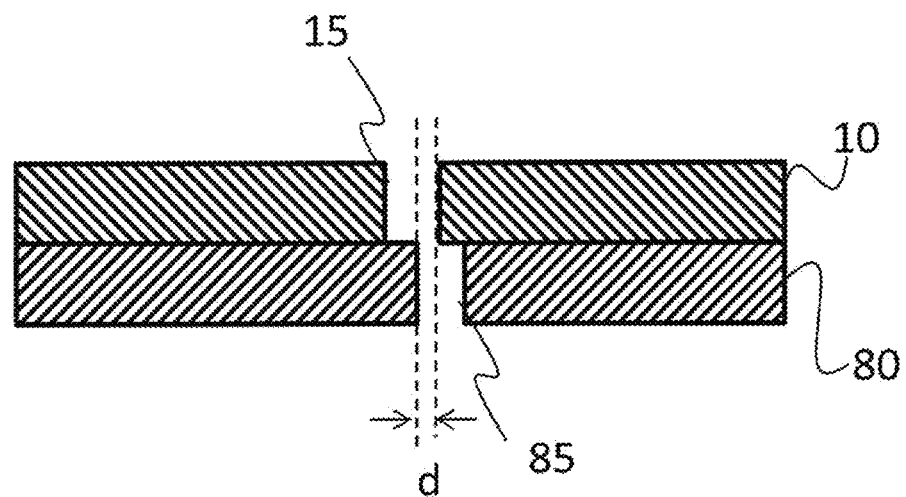
FIG. 10A is a cross-sectional view along line 10a-10a of FIG. 9A.

The second slit 85 may be disposed such that it overlaps completely with the first slit 15. A modified embodiment is shown in FIG. 9A, wherein the first slit 15 and the second slit 85 are shown to be substantially aligned in a lengthwise direction of the first slit 15 and slightly offset in a widthwise direction of the first slit 15. As shown in FIG. 10A, which is a cross-sectional view along line 10a-10a of FIG. 9A, the profile of such a smart card 100' may include effectively a single slit having an s-shape formed from the offset stacking of first metal layer slit 15 and second layer slit 85. In the case of such a slit, the insert 90 may have a corresponding shape. The s-shape of the insert 90 may allow the insert 90 to snugly fit into the slits 15 and 85 without easily becoming detached. Alternatively, the insert 90 may be separately inserted in the slit 15 and the slit 85 and then bonded by heat-pressing. An s-shaped slit may prevent the insert 90 from becoming easily detached from the card 100'.

Figure 10B:
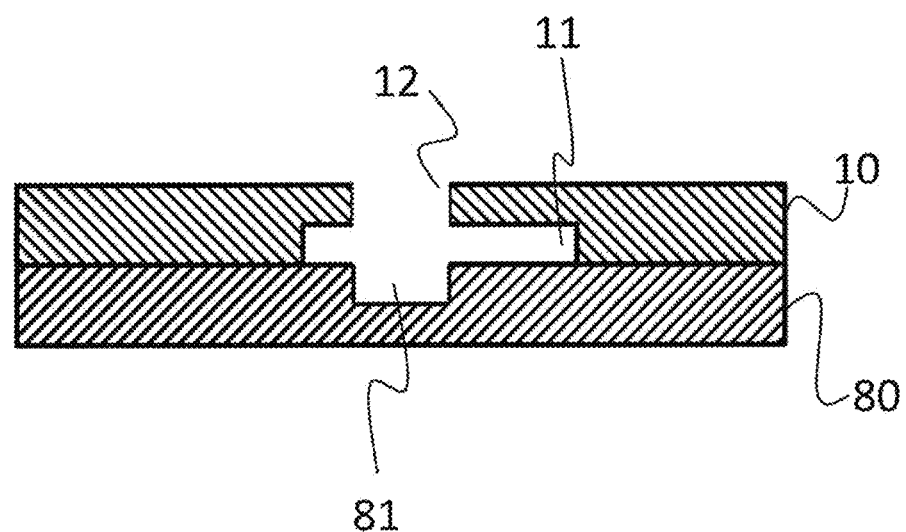
FIG. 10B is a cross-sectional view along line 10b-10b of FIG. 9A.

In one embodiment, the first metal layer 10 and the metal second layer 80 may have substantially the same thickness. The thickness of each layer may be about 0.4 mm, but may be thicker or thinner based on the desired card thickness. In FIG. 10B, which is a cross-sectional view along line 10b-10b of FIG. 9A, the inlay recess 11 may be milled to a depth of about 0.04 mm. This depth may be substantially the same thickness as the inlay 40. In the embodiments of the present invention wherein the thickness of the top layer is about 0.4 mm, a second layer recess 81 may be milled in the second layer 80. The depth of the second layer recess 81 may be about 0.2 mm. Such a depth may allow for the substrate of the inlay 40 to flex into the second layer 81 when the RFIC chip module 20 is inserted into the through-hole 12.

The slit 85 of the second layer 85 may be formed to correspond to the position of the first metal layer slit 15, effectively creating a single slit when the layers are bonded together. Both the first metal layer slit 15 and the second layer slit 85 may be 0.1 mm or more in width. In the embodiment shown in FIG. 10A, the overall width of the effective single slit, d, may be greater than 0.1 mm.

Figure 11:
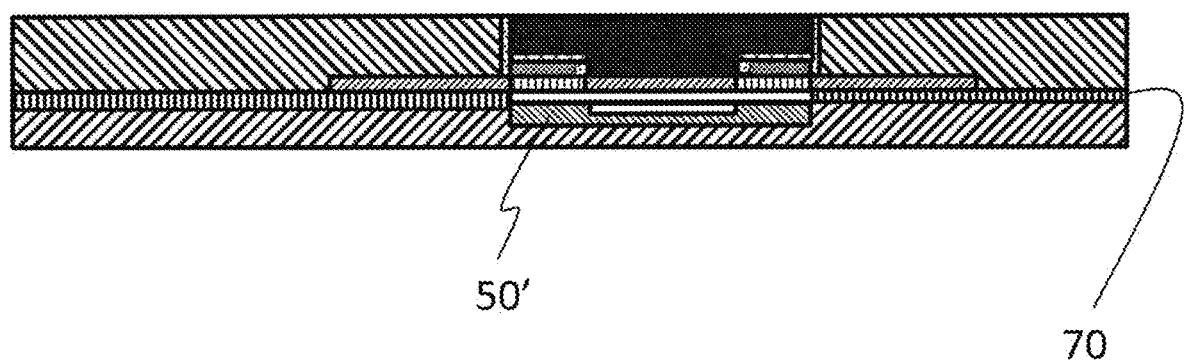
FIG. 11 is another cross-sectional view along line 8-8 of FIG. 1.

In the case where the second layer 80 is metal, the metal contactless smart card 100' may further include a connection layer 70, as shown in FIG. 11, which is another cross-sectional view along line 8-8 of FIG. 1. The connection layer 70 may be made of a synthetic resin such as PVC. The connection layer 70 may be a thin film or a sheet. The connection layer 70 may facilitate the adhesion of the first layer 10 to the second layer 80 upon heat-pressing. The connection layer 70 may also be bonded to the first layer 10 and second layer 80 by an adhesive. Preferably, the metal contactless smart card 100' may include a PVC thin film 50' on the second layer recess 81. The PVC thin film 50' may be formed to fit the chip projection 22.

Figures 12A, 12B:
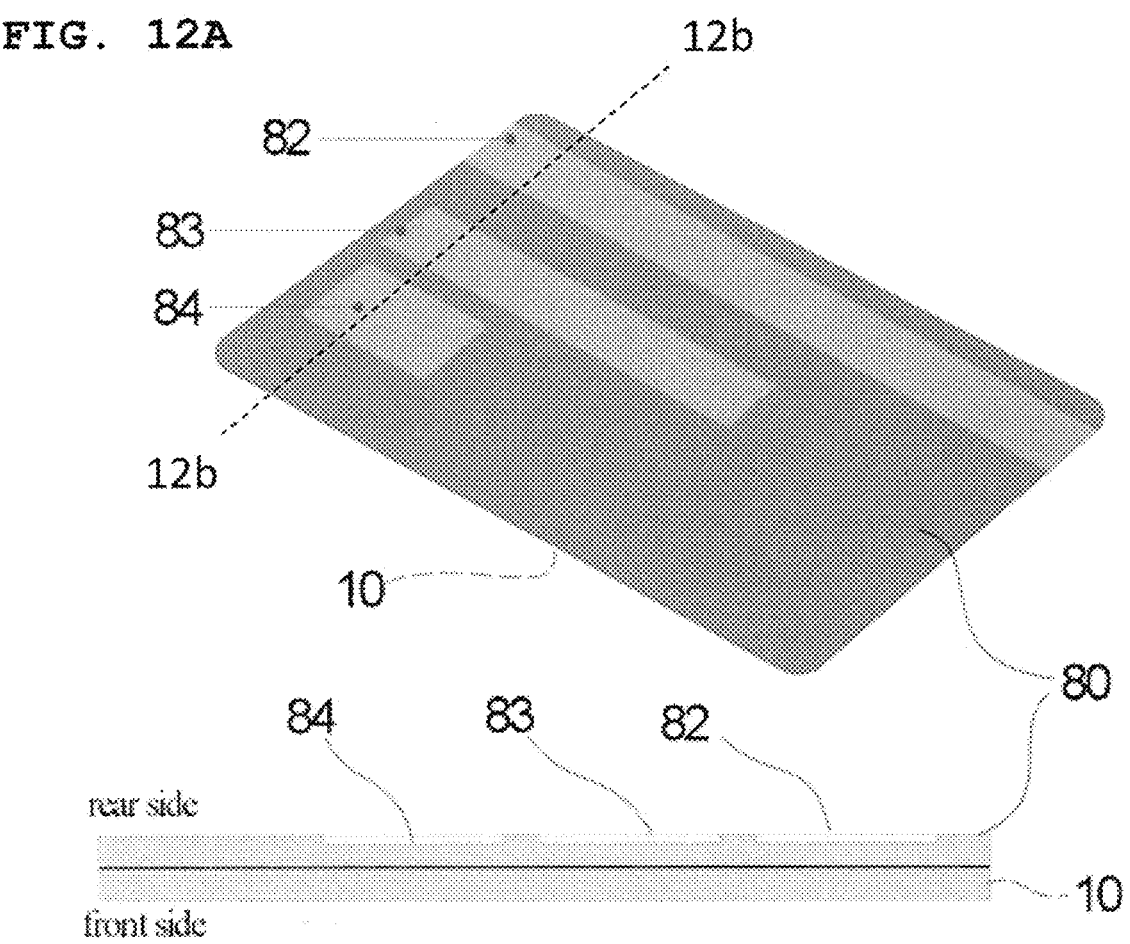
FIG. 12A is a bottom perspective view of the smart card.
FIG. 12B is a cross-sectional view along line 12a-12a of FIG. 12A.

FIG. 12A is a perspective view of a lower side (side of the second layer 80 opposite the side bonded to the first layer 10) of the metal contactless smart card 100'. FIG. 12B is a cross-sectional view along line 12a-12a of FIG. 12A. The back side may include a magnetic strip recess 82, a signature box recess 83, and a hologram portion recess 84. The recesses 82, 83, and 84 may be formed to a desired size and position. The depth of the recesses 82, 83, and 84 may be approximately 0.15 mm. The recesses 82, 83, and 84 may be formed by a method such as NC processing.

According to another embodiment of the present invention, the insert 90' may include a rod-shaped body 90a and a wing 90b. The wing 90b may further include a left wing and a right wing 90b formed along two lengthwise sides of the rod 90a. The wing may be formed by an injection molding process. This embodiment is illustrated in FIGS. 13A-17D.

FIG. 13A shows the first metal layer 10' of a metal contactless smart card 100" having a slit 15'. As shown in FIG. 13B, which is a cross-sectional view along line 13b-13b of FIG. 13A, the wing portion 90b of the insert 90' may be shorter in length than the rod-shaped body 90a. The wing portion 90b may be of a thickness that is substantially the same as the depth of the inlay recess 11. As depicted in FIG. 13C, which is a cross-sectional view of the first metal layer 10', the slit 15' may further include a side that is narrower than a second opposite side. The cross-sectional profile of the slit 15' may have a stepped structure. The stepped structure of the slit 15' may have two walls 15a and 15b.

Figures 14A, 14B, 14C:
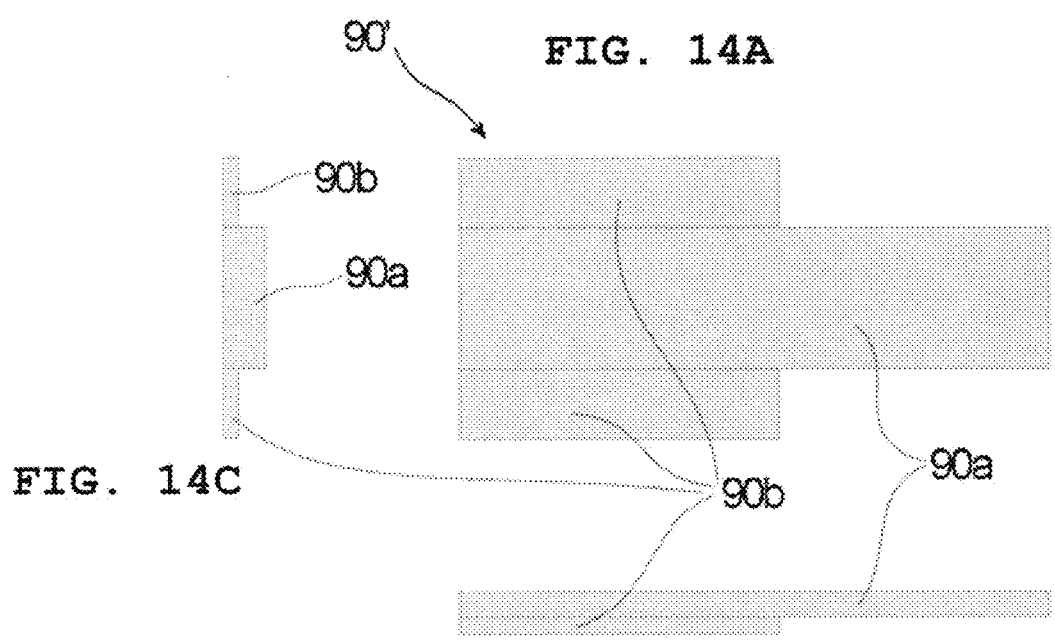
FIG. 14A is an enlarged top plan view of the insert by itself according to the third embodiment of the present invention.
FIG. 14B is a front elevation view thereof.
FIG. 14C is a side elevation view thereof.

FIG. 13D illustrates a top plan view of the insert 90' having a rod-shaped body 90a and wing portion 90b. An enlarged top plan view, front elevation view, and side elevation view of the insert 90' are shown in FIGS. 14A, 14B, and 14C, respectively. The insect 90' may be shaped to match the stepped structure of the slit 15'. The rod shaped body may have a length corresponding to a length from an edge of the first metal layer 10' to the through-hole 12. The wing portion 90b may have a length corresponding to a length from the edge of the first metal layer 10' to the inlay recess 11. The thickness of the rod-shaped body 90a may be about 0.36 mm. The thickness of the wing 90b may be about 0.24 mm. Such a structure of the slit 15' and corresponding insert 90' may prevent the detachment of the insert 90'. The insert 90', as in the other embodiments described above, may prevent the fracturing of the metal card 100" having a slit 15'.

The cross-sectional profile of the slit 90' does not necessarily have to be a sharp stepped structure as shown in FIG. 13C. The surface between the walls 15a and 15b may be an oblique plane, a curved surface, or a combination thereof.

Figure 15:
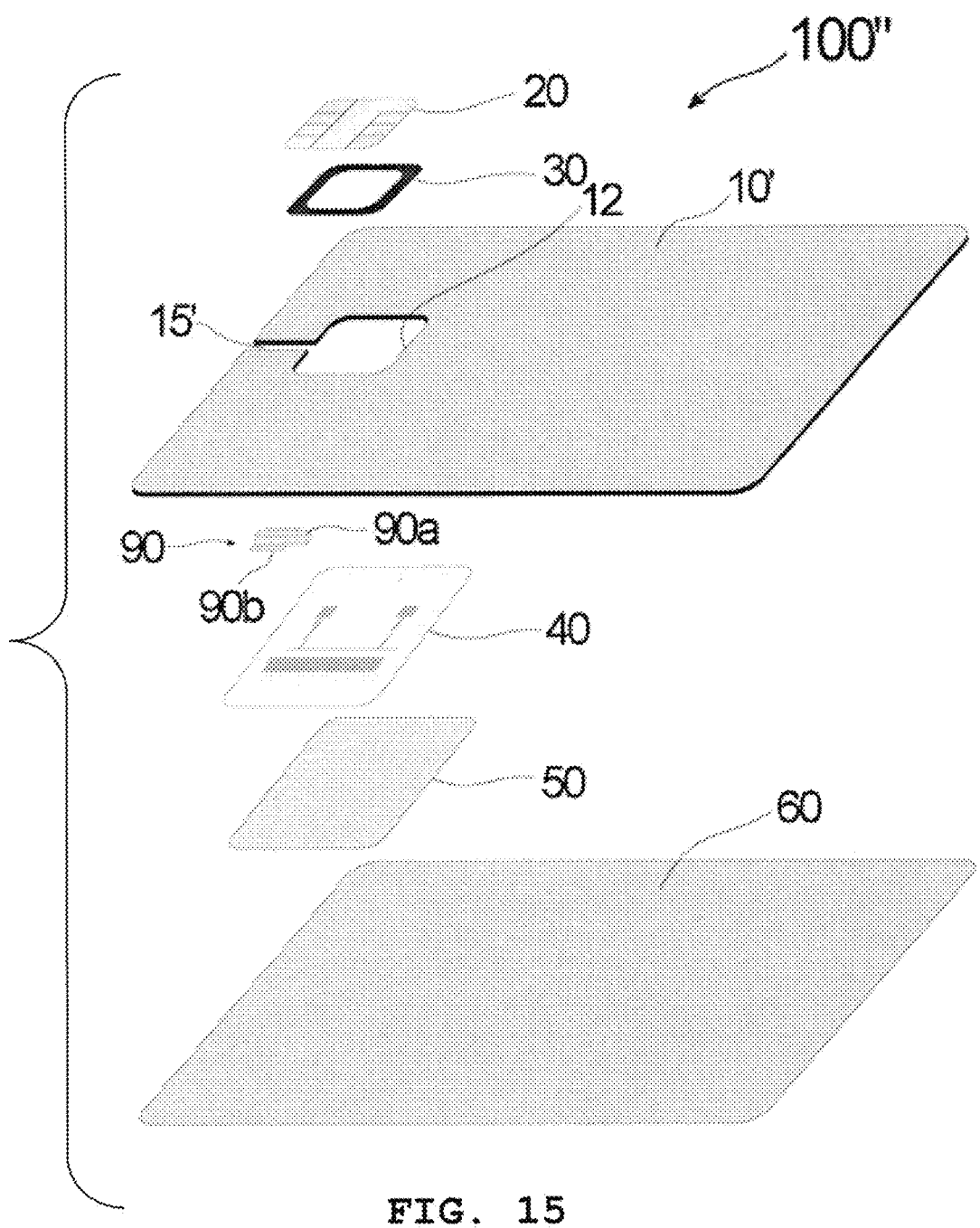
FIG. 15 is an exploded perspective view of a metal smart card according to another embodiment of the present invention.

FIG. 15 is an exploded view according to the embodiment of the present invention having a winged insert 90'. For construction of the card 100" as shown in FIG. 15, the insert 90' may be layered on the inlay 40 before the attachment of the first metal layer 10'.

As shown in FIG. 15, such an embodiment may include a second layer 60, the thin film 50, the inlay 40, the insert 90', the first metal layer 10', the PVC ring 30, and the RFIC chip module 20. During fabrication, the RFIC chip module 20 may be replaced by a dummy chip module 20'; after the layers have been bonded by a method such as heat-pressing, the dummy chip module 20' may be removed and replaced by the RFIC chip module 20.

Figure 16:
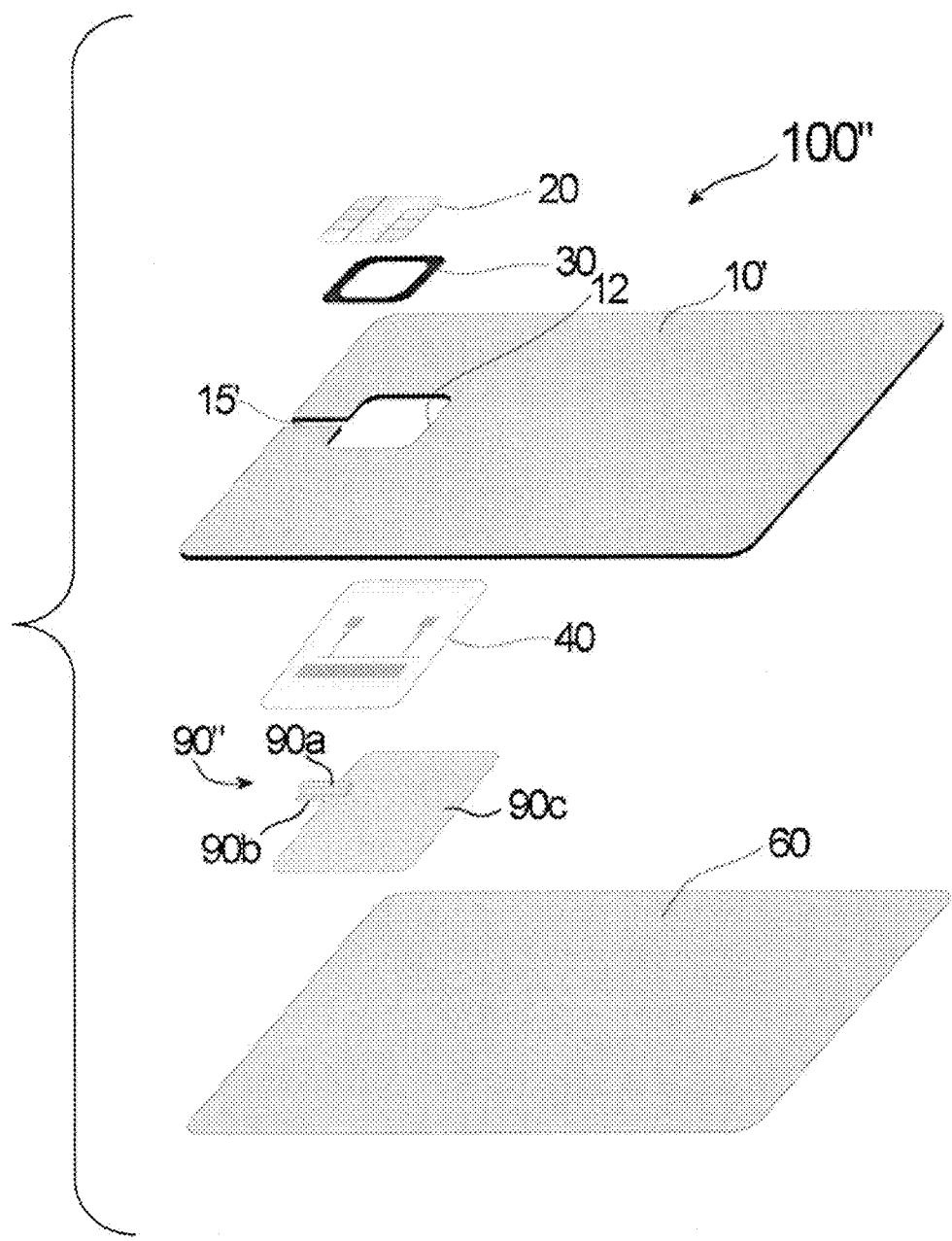
FIG. 16 is an exploded perspective view of a metal smart card according to another embodiment of the present invention.

FIG. 16 is an exploded perspective view of a metal smart card according to another embodiment of the present invention.

In a modified example of the embodiment of the present invention having a stepped slit 15', the card 100" may further include a thin film 90c formed on an end of the insert 90, wherein the thin film 90c may be made of a nonconductive material and may be received in the inlay groove 11 and disposed between the second layer 60 and the inlay 40. The thin film 90c may be made of PVC. The integration of the thin film portion 90c may improve the rigidity and durability of the insert 90".

The metal smart card 100 may be fabricated by the method including the steps of: forming the RFIC chip through-hole 12 and the inlay recess 11 on the first metal layer (10); plugging the slit (15) formed in the first layer (10) with the nonconductive material; layering the inlay (40) on the second layer (60); layering a dummy chip (20') on the inlay (40); bonding the first layer (10) and the second layer (60); and removing the dummy chip (20') and installing the RFIC chip (20).

Figure 17A:
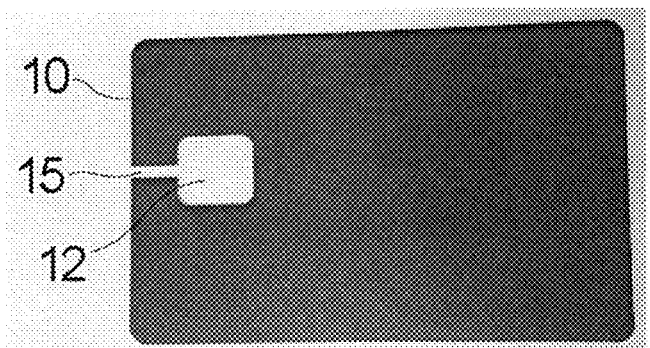
FIGS. 17A-17D are photographs illustrating the steps of a method of fabricating a metal contactless smart card.
Figure 17B:
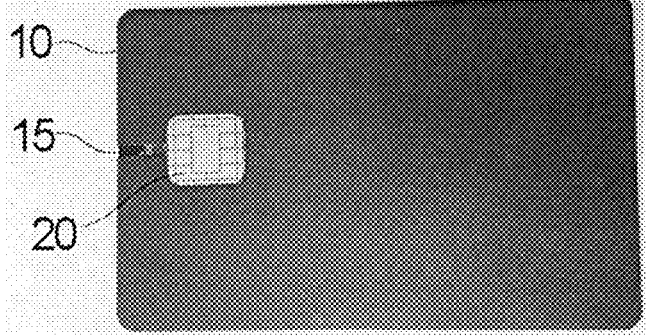

The steps of this method are illustrated in FIGS. 17A-17D. FIG. 17A is a top plan view showing the first metal layer 10 by itself having a through-hole 12 and first slit 15. Preferably, the surface may be anodized; the surface may be treated by additional or other means. FIG. 17B is a top plan view showing the card 100 upon plugging the first slit 15 with the nonconductive material, layering the inlay 40 on the second layer 60, and layering the dummy chip module 20' on the inlay 40. These layers may be bonded by a method such as heat-pressing. Other forms of adhering layers may be employed.

Figure 17C:
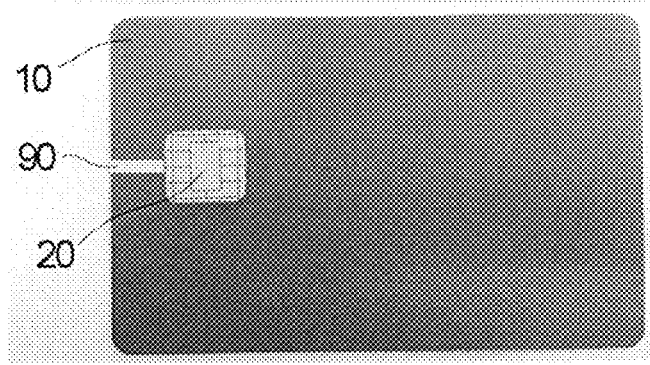
Figure 17D:
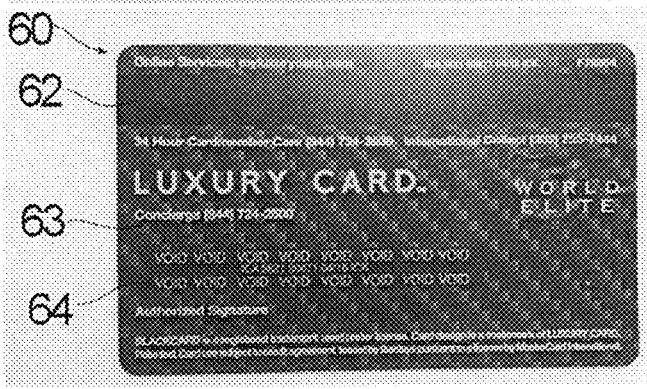

Upon bonding, the dummy chip module 20' may be removed and the RFIC chip module 20 may be installed in place of the dummy chip module 20' as shown in the top plan view of FIG. 17C. The RFIC chip module terminals 14 and 14' may be electrically connected to the inlay terminals 41 and 41'. The electrical connection may be formed by a conductive glue, a solder, an initiator, or a combination thereof. FIG. 17D is a bottom plan view of the card 100 after completion of fabrication. The surface of the second layer 60 that is not bonded to the first layer 10 may further include a magnet strip 62, a signature portion 63, and a hologram portion 64.

In a modified example of the embodiment described in the preceding paragraphs, the insert 90 may be pre-fabricated and inserted in the slit as a last step of the fabrication step.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for fabricating a smart card having a first metal layer (10 or 10') with a first slit (15 or 15'), a RFIC chip module (20), an inlay (40) having an antenna, and a second layer (60 or 80) comprising the steps of:
    forming a RFIC chip module through-hole (12) and an inlay recess (11) on the first metal layer (10);
    plugging the first slit (15 or 15') formed in the first layer (10) with a nonconductive material;
    layering the inlay (40) on the second layer (60 or 80);
    layering a dummy chip module (20') on the inlay (40) such that the dummy chip module is positioned in the through-hole;
    subsequent to the steps of layering the inlay on the second layer and layering the dummy chip module on the inlay, bonding the first layer (10 or 10') and the second layer (60 or 80); and
    after bonding the first layer (10) and the second layer (60), removing the dummy chip module (20') and installing the RFIC chip module (20).

2. The method of claim 1, wherein the first layer (10 or 10') and the second layer (60 or 80) are bonded by heat-pressing.

3. The method of claim 1, wherein the recess (11) surrounds the through-hole (12).

4. The method of claim 1, wherein the first slit (15) is at least 0.1 mm in width.

5. The method of claim 1, wherein the cross-sectional profile of the first slit (15') is wider on the lower side of the first metal layer (10') than an upper side of the first metal layer (10).

6. The method of claim 1, wherein the second layer (60) is made of a synthetic resin.

7. The method of claim 1, wherein the inlay (40) comprises a substrate, the antenna having a first wound coil (42) and a second wound coil (42'), and two inlay terminals (41 and 41'),
    wherein the inlay terminals (41 and 41') are formed to pass through the substrate of the inlay (40) as to be exposed on both sides of the inlay (40),
    wherein the inlay terminals (41 and 41') are formed at the ends of the first wound coil (42) and the second wound coil (42'), wherein the first wound coil (42) is formed on a surface of the substrate of the inlay (40) and the second coil (42') is formed on an opposite surface of the substrate of the inlay (40), wherein the two coils (42 and 42') are connected by a via hole (43) formed through the substrate of the inlay (40), wherein the inlay terminals (41 and 41') are electrically connected to two RFIC chip module terminals (14 and 14'), wherein one of the two coils (42 and 42') further comprises a wide portion (42a) and the other of the two coils (42 and 42') further comprises a plurality of islands (44 and 44'), wherein the overall capacitance of the inlay may be adjusted by electrically insulating a number of islands (44') and facilitate impedance matching.

8. The method of claim 1, wherein the second layer (80) is metallic and comprises a second slit (85), wherein the second slit (85) is disposed from an interior portion of the second layer (80) to an edge of the second layer (80), wherein the second slit (85) is disposed to be substantially aligned in a lengthwise direction with the first slit (15) and shifted in a widthwise direction with respect to the first slit (15) by less than the width of the first slit (15) and an insert having a shape corresponding to the stacked slits is snugly fit in the slits.

9. A method for fabricating a smart card having a first metal layer (10 or 10') with a slit (15 and 15'), an RFIC chip module (20), an inlay (40) having an antenna, and a second layer (60 or 80) comprising the steps of:

forming a RFIC chip module through-hole (12) and an inlay recess (11) on the first metal layer (10 or 10');

positioning the inlay (40) on the inlay recess (11), an insert (90) in the first slit (15 or 15') of the first metal layer (10 or 10'), and a dummy chip (20') in the through-hole (12);

subsequent to the step of position the inlay, the insert, and the dummy chip, bonding the first metal layer (10 or 10') on a second layer (60 or 80) by heat-pressing; and removing the dummy chip module (20') and installing a RFIC chip module (20).

10. The method claim 9, wherein the insert (90) has a shape corresponding to the slit (15 or 15'), wherein the insert (90) is made of a nonconductive material.

11. The method claim 10, wherein the insert (90') comprises a rod-shaped body (90a) with a left wing and a right wing (90b), wherein the left wing and right wing (90b) are formed on opposite sides of the rod-shaped body (90a), wherein the left wing and right wing (90b) are smaller than the rod-shaped body (90a).

12. A method for fabricating a smart card having a first metal layer (10 or 10') with a first slit (15 or 15'), a RFIC chip module (20), an inlay (40) having an antenna, and a second layer (60 or 80) comprising the steps of:

forming a RFIC chip module through-hole (12) and an inlay recess (11) on the first metal layer (10);

plugging the first slit (15 or 15') formed in the first layer (10) with a nonconductive material;

layering the inlay (40) on the second layer (60 or 80);

layering a dummy chip module (20') on the inlay (40);

bonding the first layer (10 or 10') and the second layer (60 or 80); and after bonding the first layer (10) and the second layer (60), removing the dummy chip module (20') and installing the RFIC chip module (20), wherein the second layer (80) is metallic and comprises a second slit (85), wherein the second slit (85) is disposed from an interior portion of the second layer (80) to an edge of the second layer (80), wherein the second slit (85) is disposed to be substantially aligned in a lengthwise direction with the first slit (15) and shifted in a widthwise direction with respect to the first slit (15) by less than the width of the first slit (15) and an insert having a shape corresponding to the stacked slits is snugly fit in the slits.

13. The method of claim 12, wherein the first layer (10 or 10') and the second layer (60 or 80) are bonded by heat-pressing.

14. The method of claim 13, wherein the cross-sectional profile of the first slit (15') is wider on the lower side of the first metal layer (10') than an upper side of the first metal layer (10).

15. The method of claim 12, wherein the recess (11) surrounds the through-hole (12).

16. The method of claim 12, wherein the first slit (15) is at least 0.1 mm in width.

17. The method of claim 12, wherein the second layer (60) is made of a synthetic resin.

* * * * *